Figure 1:
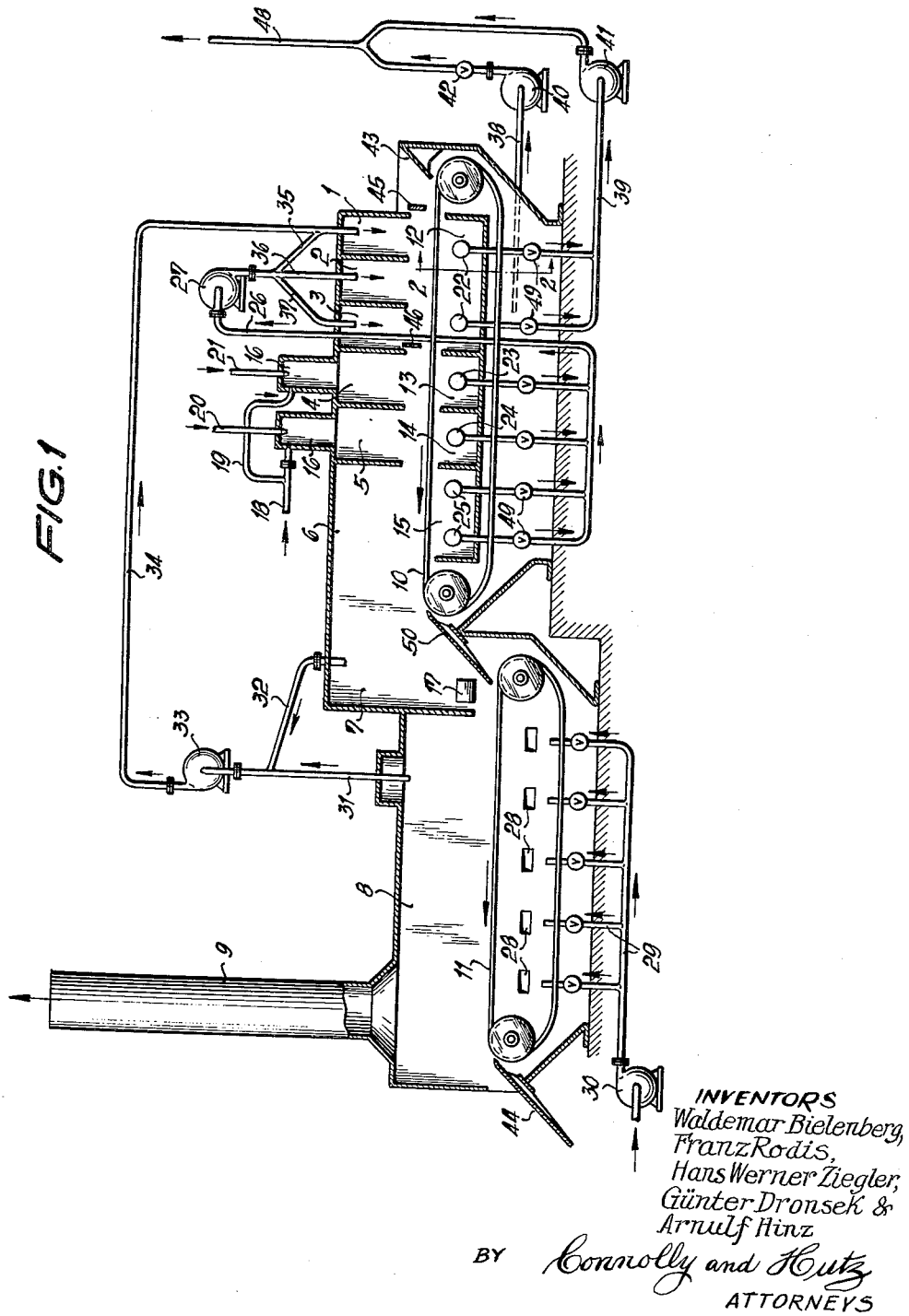

Aug. 6, 1963    W. BIELENBERG ETAL    3,100,106
PROCESS AND APPARATUS FOR THE DRYING AND BURNING OF PELLETS
Filed Jan. 11, 1961
2 Sheets-Sheet 1

INVENTORS
Waldemar Bielenberg,
Franz Rodis,
Hans Werner Ziegler,
Günter Dronsek &
Arnulf Hinz
BY Connolly and Hutz
ATTORNEYS Aug. 6, 1963 W. BIELENBERG ETAL 3,100,106
PROCESS AND APPARATUS FOR THE DRYING AND BURNING OF PELLETS
Filed Jan. 11, 1961
2 Sheets-Sheet 2

INVENTORS
WALDEMAR BIELENBERG
FRANZ RODIS
HANS WERNER ZIEGLER
GUNTER DRONSEK
BY ARNULF HINZ
Connolly and Hutz
ATTORNEYS

United States Patent Office 3,100,106
Patented Aug. 6, 1963

3,100,106
PROCESS AND APPARATUS FOR THE DRYING
AND BURNING OF PELLETS
Waldemar Bielenberg, Cologne-Klettenberg, Franz Rodis and Hans Werner Ziegler, Knapsack, Gunter Dronsek, Amberg, Oberpfalz, and Arnulf Hinz, Knapsack, Germany, assignors to Knapsack-Griesheim Aktiengesellschaft, Knapsack, near Cologne, Germany, a corporation of Germany
Filed Jan. 11, 1961, Ser. No. 82,091
Claims priority, application Germany Jan. 13, 1960
17 Claims. (Cl. 263—8)

The present invention relates to a process and apparatus for drying and burning pellets of powdered and/or granular mineral substances, for example phosphates, which pellets have been made on granulating disks or compressed on a briquetting press.

It is known to dry and burn pellets of the aforesaid kind on traveling grates, for example Lepol grates or Dwight-Lloyd bands. Traveling grates of this kind with interposed chambers which are separated from one another by partition walls and are used as drying, burning or suction chambers, depending on a given purpose, are also known as such. Plants of this kind are heated with hot exhaust gases, for example, those from a rotary furnace, or by special heating means, for example, by gas firing.

Since it is, however, necessary to avoid, on the one hand, overheating of the grate and to observe, on the other hand, the dew point of the water vapor drawn off with the exhaust gases, the operation of such plant is very limited so that the heat expended cannot be utilized satisfactorily.

The present invention provides a process which enables the aforesaid disadvantages to be overcome.

The process of the invention for the continuous drying and burning of mineral pellets, particularly those of phosphates, on a traveling grate running through drying and burning chambers which are separated from one another by partition walls and beneath which suction chambers are disposed, comprises operating the burning chambers, which are charged with heating gases, for example, from a gas burner, by means of control devices in a manner such that when the pellets leave the burning chambers only ⅖ of the height of the layer of pellets have been burnt, whereby the permeability to the heating gases of the traveling grate charged with pellets is kept uniform over its entire width and the pellets of the lower part of the layer which are only high-dried serve as covering layer. In a following sojourn and hardening zone, the said lower portion of the layer of pellets is then heated to hardening temperature by transmission of the sensible heat of the burnt pellets lying thereon by means of heat conduction and radiation or convection with the help of a controlled slow current of exhaust gas which is sucked through in a downward direction. The pellets corresponding to the entire height of the layer are then introduced into a heat compensation chamber, while being mixed. After a certain time of stay in the heat compensation chamber, the pellets are fed from said chamber to a cooling band from the end of which they are withdrawn for further treatment.

In the process of the invention, portions of the streams of air sucked in a downward direction through the pellets in the sojourn and hardening zone and/or in an upward direction through the pellets on the cooling band, are blown into the drying chambers disposed before the burning chambers in order to serve as heat carriers.

The process is carried out in chambers connected in series: drying chambers, burning chambers, a sojourn and hardening chamber, a heat compensation chamber and a cooling chamber.

One and the same traveling grate is used for feeding the pellets to the drying chambers, the burning chambers and the sojourn and hardening chamber.

A second traveling grate which is independent of the first one runs as cooling band through the cooling chamber.

Between the end of the first traveling grate and the beginning of the second one, the heat compensation chamber is disposed which is provided with a device to additionally heat, if necessary, the pellets which stay in that chamber for a certain period of time.

In the process of the invention, it is of importance that uniform results be obtained over the whole width of the first traveling grate. For this purpose three measures are combined: (a) the free-space sectional area in the marginal zones of the traveling grate is smaller than that in the middle section; (b) strippers are installed, the profile of which is designed in a manner such that the height of the layer of pellets in the marginal areas is considerably higher than that in the middle section; (c) the cross-sections of the suction lines disposed beneath the traveling grate decrease towards the marginal zones of the traveling grate.

An apparatus suitable for use in carrying out the process of this invention is illustrated diagrammatically by way of example in the accompanying drawings.

Referring to the drawings, FIG. 1 is a longitudinal view of the total system. That figure shows drying chambers 1, 2 and 3 for the material fed to the plant, burning chambers 4 and 5, sojourn and hardening chamber 6, heat compensation chamber 7, cooling chamber 8, exhaust gas chimney 9, traveling grate 10, cooling band 11, suction chambers 13 to 15 with suction lines 23 to 25, gas burners 16 and additional heating means 17 for heat compensation chamber 7. Gas burners 16 are supplied with fuel gas through lines 18 and 19 and with air for combustion through lines 20 and 21. Numeral 26 denotes a collecting line for hot combustion gases which is connected to suction draught blower 27; the hot combustion gases may be pressed through lines 35, 36 and 37 into drying chambers 1, 2 and 3. Numeral 28 designates outlets disposed beneath cooling band 11 and through which issues the cooling air introduced through lines 29 by blower 30. Numerals 31 and 32 designate lines connected to suction draught blower 33 and through which outgoing air from heat compensation chamber 7 and cooling chamber 8 flows into pressure pipe 34 to be fed to drying chambers 1 to 3.

Drying chambers 1 to 3 are connected to suction chamber 12 provided with suction lines 22. The latter are connected via lines 38 and 39 to suction draught blowers 40 and 41 which press the outgoing air into line 48.

Numeral 42 designates a shut-off device mounted at the pressure side of the suction draught blowers.

The pellets to be burnt are fed via chute 43 while the pellets that have been burnt are removed via chute 44.

Numerals 45 and 46 denote strippers for the pellets, which strippers are disposed above the travelling grate.

Figure 2:
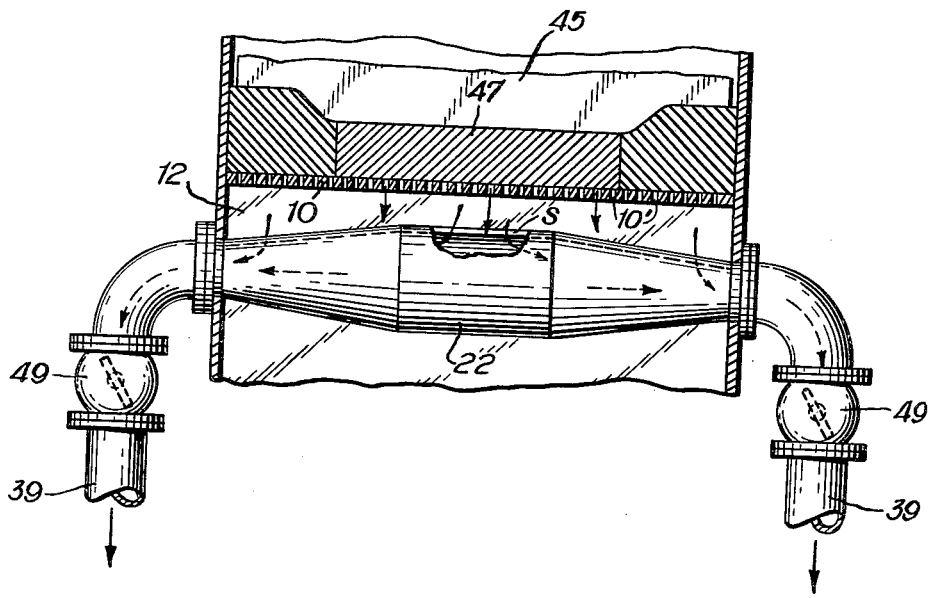

FIG. 2 is a cross-sectional view along line 2—2 of FIG. 1 of the traveling grate with a layer of pellets 47 supported on grate rods 10'.

Figure 3:
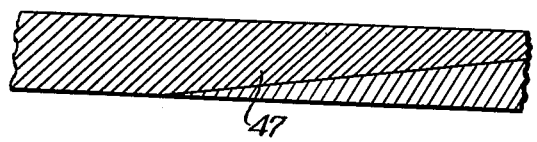

FIG. 3 is a longitudinal view of layer 47. The wider hatching indicates the material that has been burnt completely, while the narrow cross-hatching represents the material that has been burnt to a certain extent only.

The fresh pellets which are more or less moist are fed via chute 43 to traveling grate 10 and travel slowly through drying chambers 1 to 3 which are separated from each other by partition walls, the drying temperature increasing from chamber 1 to chamber 3. At the same time, hot dry exhaust gases which, to begin with, are regarded as being available are pressed from above through lines 35, 36 and 37 into drying chambers 1, 2 and 3 by suction draught blower 27 or 33. The exhaust gases flow through the layer of pellets on traveling grate 10 and through traveling grate 10 itself and are drawn off from suction chamber 12 disposed beneath the upper tower of the traveling grate via suction lines 22 provided with control means 49 and via collecting lines 38 and 39 by suction draught blowers 40 and 41 which are operated simultaneously or alternately and are then pressed through collecting line 48 into the open. Owing to their high moisture content, these exhaust gases cannot be further used in the present process and are therefore allowed to escape into the open. In order not to subject the pellets to unnecessary mechanical stress, the drying process is carried out under such mild conditions that the water present in the interior of the pellets has sufficient time to diffuse to the surface and to evaporate there.

After leaving drying chambers 1, 2 and 3, traveling grate 10 with the pellets thereon travels through burning chambers 4 and 5 which are separated from each other and the drying chambers by partitions. In burning chambers 4 and 5 a stream of hot combustion gases is conducted in a downward direction through the layer of pellets and traveling grate 10 and enters suction chambers 13 and 14 where it is drawn off through suction lines 23 and 24 and collecting line 26 by suction draught blower 27 in order to give off the sensible heat to the freshly introduced pellets in drying chambers 1, 2 and 3.

The necessary amounts of heat are supplied, for example, by gas burners 16 which are mounted on combustion chambers 4 and 5 and are fed with air for combustion through pipe sockets 20 and 21 and with fuel gas through pipe sockets 18 and 19.

The burning process is conducted in a manner such that about 4/5 of the height of the layer of pellets have been completely burnt when the pellets leave burning chamber 5, while the remaining lower fifth serves as covering layer protecting the traveling grate against heat.

Burning chambers 4 and 5 are followed by sojourn and hardening chamber 6 which is separated from the burning chambers by a partition. In said sojourn and hardening chamber the dried and preheated but not yet burnt lower fifth of the height of the layer of pellets is burnt. That burning takes place at the expense of the heat content of the burnt pellets lying on that lower fifth of the layer of pellets, substantially by sucking exhaust gas through the layer of pellets via suction chambers 15 and suction lines 25 into collecting line 26.

On leaving sojourn and hardening chamber 6, the now burnt pellets are thrown off via chute 50 into heat compensation chamber 7 where the pellets stay for some time while a very complete heat compensation takes place by heat conduction, radiation and, since the throwing off amounts to a mixing of the individual pellets, also by convection. In special cases, the heat compensation chamber 7 may be additionally heated through opening 17. Gas may be drawn off through line 32 by suction draught blower 33.

A second traveling grate designated as cooling band 11 withdraws the pellets from heat compensation chamber 7 and transports them slowly through cooling chamber 8 to delivery chute 44. On that way, cooling air is blown from below through cooling band 11 and the layer of pellets, the cooling air being pressed below cooling band 11 by cooling blower 30 through lines 29 and outlets 28. Part of the cooling air heated by the pellets is drawn off through line 31 by suction draught blower 33 and further used in drying chambers 1, 2 and 3, while the remainder flows into exhaust gas chimney 9 and escapes into the open.

When the suction draught blowers are not in operation they are shut off from the pipe system by shut-off devices 42 disposed at the pressure side of the suction draught blowers.

When gases are conducted through a uniformly high layer of granular bodies, it is always observed in the case of a limited area that the resistance to flow in the marginal zones is smaller than, for example, that in the middle section. This disadvantage can be removed and uniform drying as well as uniform burning of the pellets can be obtained by a combination of the following three measures:

As shown diagrammatically in cross-sectional view in FIG. 2, the free-space sectional area of traveling grate 10 in the marginal zones is smaller than that in the middle section.

Another means for obtaining a uniform resistance to flow consists in varying the height of layer 47 so that the height in the marginal zones is greater than that in the middle portion. For that purpose, strippers 45 and 46 are disposed, for example, at the entrance to drying chamber 1 and the entrance to burning chamber 4, in order to bring about the desired variation of the height of layer as a function of the distance from the longitudinal axis of traveling grate 10.

Furthermore, according to FIG. 2, an opening slot S extends longitudinally of the suction line 22 along the top thereof and the cross-section of suction line 22 disposed in suction chamber 12 decreases towards the marginal zones of traveling grate 10.

By a combination of these three measures, a uniform resistance to flow is obtained over the whole width of traveling grate 10.

FIG. 3 is a longitudinal view of layer 47 placed on traveling grate 10 taken at about the transition from burning chamber 5 to sojourn and hardening chamber 6. The wider hatched area represents the material that has been burnt completely while the narrow cross-hatched area represents the material that has only been high-dried and is gradually sintered by the absorption of part of the sensible heat of the pellets that have been burnt.

The process of the invention has the special advantage that a small amount of heat is consumed and uniform pellets are obtained. For drying the pellets, heat (hot dry exhaust gases) may be supplied from sojourn and hardening chamber 6 and heat compensation chamber 7 or from cooling chamber 8 or in an adjustable proportion from all of these chambers simultaneously. Further, though smaller, amounts of heat may be supplied from the burning chamber.

The range of temperature through which the pellets pass as a function of time can be adjusted in a manner such that optimum results are obtained as regards the specific heat consumption and the properties of the pellets.

The following example serves to illustrate the invention but it is not intended to limit it thereto.

*Example*

In the apparatus of the invention, pellets are hardened which have been made on granulating disks from an appropriate phosphate and detritus formed in the sintering process, while simultaneously introducing an aqueous suspension of a binder through a nozzle.

The "green" pellets which have not yet been burnt have a diameter of 25 to 35 mm. and withstand a pressure of 2 to 3 kg. without crumbling. In view of this relatively low strength, the pellets have to be fed to the traveling grate very carefully so as to form a loose packing.

After being thrown-off from the granulating disk, the green pellets are fed to traveling grate 10 by a belt conveyor swinging at a variable angular velocity and are thrown off onto the said traveling grate over the whole width of the latter (3,200 mm.). The kind of the layer of pellets on the traveling grate depends on the swinging movement of the belt conveyor and the action of an appropriate adjustable stripper 45. The height of the layer depends on the quality of the pellets. It amounts to 300 to 400 mm. in the middle section of traveling grate 10, while it is by 30 to 40% higher over a width of about 500 mm. on either side of the traveling grate. In this manner it is achieved that the smoke gases in drying chambers 1, 2 and 3 or the heating gases in burning chambers 4 and 5 flow through at a uniform rate over the entire width of the grate.

The appropriate height of the layer of pellets is determined by means of the difference between the pressures measured above traveling grate 10 and the pressures measured below traveling grate 10 and by the course the burning takes over the entire width of the grate and which can be observed through sight-glasses disposed at the position where the pellets are thrown off.

The traveling grate with the pellets thereon passes through the plant at a rate of 0.4 to 0.5 m./min.

Traveling grate 10 is operated in a manner such that the pressures above the grate in drying chambers 1, 2 and 3 and in burning chambers 4 and 5 are within the range of ±0 and at most −5 mm. column of water while the pressures below the grate, and correspondingly the pressure differentials, are subjected to certain variations depending on the nature of the pellets in a given case. The pressures below traveling grate 10 are as follows: about −200 mm. column of water in drying chambers 1, 2 and 3; about −150 to about −175 mm. column of water in burning chamber 4; about −125 to about −175 mm. column of water in burning chamber 5. In sojourn and hardening chamber 6, the pressures above and below traveling grate 10 are between about ±0 and about −10 mm. column of water, depending on the direction in which the gases are sucked off. The latter depends on the temperatures prevailing below traveling grate 10, that is on the position of the burning zone on traveling grate 10, according to which the gases are sucked off in the direction of blower 32 or blower 27 or need substantially not be sucked off at all.

In drying chambers 1, 2 and 3 the predominant portion of the water of granulation is removed from the pellets by supply of heat. It is important that the temperatures be raised gradually from about 150° C. in the first drying chamber to about 250° C. in the second one and about 350° C. in the third one in order to dry the pellets under mild conditions and to avoid a dangerous bursting of the pellets as it is always liable to occur if the water is removed rapidly.

The necessary temperatures in drying chambers 1, 2 3 are obtained by blowing the smoke gases from burning chambers 4 and 5 into drying chamber 1, a mixture of smoke gases and exhaust gases from sojourn and hardening chamber 6 and/or hot outgoing air from cooling band 11 into drying chamber 2, and a mixture of 350° C. of exhaust gases from sojourn and hardening chamber 6 and/or hot outgoing air from cooling band 11 into drying chamber 3. The temperatures of the exhaust gases in the drying chambers, measured as mixed temperature immediately before suction draught blowers 40 and 41, are within the range of 90 to 110° C. With the prevailing proportion between amount of gas and amount of water (low relative moisture), the temperature does not drop below the dew point of the water vapor.

In the aforesaid manner, a great proportion of the amounts of heat available as waste heat in burning chambers 4 and 5, sojourn and hardening chamber 6 and at cooling band 11 can be utilized and the pellets which are introduced in the moist state can be subjected to a controlled drying in the drying chambers by mixing the hot gases. The process of the invention has the further advantage that the layer of moist pellets in the drying chambers makes an excellent filter for the dust-laden exhaust gases.

In burning chambers 4 and 5, the pellets are heated to a temperature within the range of about 900 to about 1000° C. to remove the residual water of granulation and expel or destroy crystal water and volatile portions such as carbon dioxide and organic substances. At the said temperatures, sintering of the phosphates begins in the outer portions of the pellets and, besides that phenomenon, the temperature of the pellets rises above the melting point of the potassium- or sodium-meta- and pyrophosphates contained in the Cottrell dust used as binder and hardening begins.

The temperature in burning chamber 4 is maintained at about 900 to about 950° C. and that in burning chamber 5 at about 950 to about 1000° C. The roof temperatures pertaining thereto can be adjusted by supply of secondary and tertiary air so as to exceed the aforesaid values by at most about 50° C., whereby the lining of the roof is saved in case heat accumulation occurs. The mixed temperature of the exhaust gases from burning chambers 4 and 5 immediately before suction draught blower 27 is within the range of 150 to 200° C.

During the period of time for which the hot pellets stay in the sojourn and hardening chamber the hardening proceeds. In said sojourn and hardening chamber, the gas space above traveling grate 10 has a temperature of about 700 to about 800° C. at a pellet temperature of about 900° C.; in the gas space below traveling grate 10 the temperature rises to about 600° C., the highest temperature permissible at that position.

The pellets leaving traveling grate 10 enter heat compensation chamber 7, while being thoroughly mixed, and are allowed to stay there for some time for heat compensation between the pellets which may have different temperatures and, consequently, for further hardening.

By introducing fresh air, the temperature of the exhaust gases sucked off from the heat compensation chamber and consequently from the sojourn and hardening chamber is adjusted to about 350° C., measured immediately before suction draught blower 33.

In heat compensation chamber 7, the pellets are gradually received by cooling band 11 and transported through cooling chamber 8 to chute 44. The roof temperature in cooling chamber 8, measured at the position where the hot outgoing air is removed through line 31, ranges from about 650 to about 750° C.; by the addition of fresh air, the hot air from cooling chamber 8, alone or in admixture with the exhaust gases from sojourn and hardening chamber 6 and heat compensation chamber 7, is cooled to about 350° C., measured immediately before suction draught blower 33.

The process of the invention dispenses with a special covering layer for protecting traveling grate 10 from overheating. Instead, the working conditions are chosen in a manner such that part of the layer of pellets acts as covering layer in burning chambers 4 and 5 and partially also in sojourn and hardening chamber 6 and protects traveling grate 10 against overheating.

For this purpose, only such an amount of heat is supplied to the lower portion of the layer of pellets on traveling grate 10 by the dosed transmission of sensible heat from the upper part of the layer that the values of strength obtained in the said lower portion, i.e. the covering layer, are just satisfactory. Since the sojourn and hardening chamber may be connected to suction draught blower 27 or to suction draught blower 33, the exhaust gases may be directed towards the traveling grate and thereby transmit heat to the covering layer or may be conducted in an opposite direction whereby they cool traveling grate 10 with the help of fresh air introduced below said traveling grate.

The burnt pellets withstand pressures from about 80 to about 120 kg. before being crushed, while the pellets of the covering layer withstand pressures from about 50 to about 80 kg. This result can be regarded as good since values of 60 to 75 kg. are required for further use in industry.

The proportion of detritus amounts to about 15%. The heat consumption is between 280 and 320 thermal units per kilogram of sintered material, depending on the chemical composition of the starting materials and the amount of water of granulation contained in the pellets.

We claim:

1. A process for drying and calcining mineral pellets which comprises feeding recently formed wet pellets onto one end of and over the entire width of a continuously traveling first gas pervious grate to form a uniform layer of said pellets, passing a heated gas downwardly through the pellet layer to dry the wet pellets, increasing the temperature of the gas as the layer travels along, thereafter passing downwardly through said layer of dried pellets hot combustion gases originating from externally fired fuel, raising the temperature in successive steps of such gas to such an extent that the pellets corresponding to approximately ⅘ of the total height of said layer are calcined, whereby the lowermost ⅕ serves as a protective layer for the grate, passing downwardly in a following sojourn zone a slow stream of heated gas through said moving layer to transfer part of the heat contained in the top layer of the pellets to said underlying dried protective layer, introducing said pellet layer while thoroughly intermixing the pellets into a heat compensation zone, keeping said pellets in said zone for a pre-determined duration to equalize the temperatures of the individual pellets, continuously discharging substantially uniformly hot pellets from said heat compensation zone, forming a substantially uniform layer of pellets on a second gas-previous traveling grate, passing upwardly through said layer a stream of cooling air to cool said layer of calcined pellets, and finally discharging pellets from said second grate.

2. The process of claim 1 wherein a portion of the gas passing through the pellets in the sojourn zone, a portion of the stream of the cooling air, and said hot combustion gases originated from externally fired fuel are used as said heated gas to dry said wet pellets.

3. The process of claim 1 wherein the temperature of the heated gas used for drying the wet pellets is within the range of about 150–350° C.

4. The process of claim 3 in which the temperature of said heated gas is increased in three stages of about 150° C., about 250° C. and about 350° C. respectively.

5. The process of claim 1 wherein said hot combination gases originating from externally fired fuel have a temperature of about 900–1000° C.

6. The process of claim 5 wherein the temperature of said combustion gases is increased in two stages of about 900–950° C. and about 950–1000° C. respectively.

7. The process of claim 1 wherein said stream of cooling air initially has normal atmospheric temperature, and a temperature of about 650–750° C. after passing upwardly through said pellet layer.

8. The process of claim 1 wherein said hot combustion gases have a temperature of about 150–200° C. after passing downwardly through said layer of dried pellets.

9. The process of claim 1 wherein said heated gas used to dry the wet pellets has a temperature of about 90–110° C. after being passed downwardly through the wet pellets.

10. The process of claim 1 wherein the slow stream of heated gas passing downwardly through said moving layer of pellets in the sojourn zone has an initial temperature of about 700–800° C. and a temperature of up to about 600° C. after passing through said layer of pellets.

11. The process of claim 1 wherein the pellets are crude phosphate pellets.

12. An apparatus for the continuous drying and burning of mineral pellets which comprises a drying chamber, a following calcining chamber connected to said drying chamber and provided with gas burners, a following sojourn chamber connected with said calcining chamber, a heat compensation chamber connected with said sojourn chamber, a first traveling grate passing through said drying, calcining and sojourn chambers in the order stated, a cooling chamber, said chambers being walled chambers, a second traveling grate running through said cooling chamber at a lower level than said first grate, the individual chambers being provided with gas inlet means and gas outlet means extending through said walls in a manner such that said gas outlet means are disposed below the first traveling grate, cooling gas inlet means are disposed below the second traveling grate, and suction means connected with said gas outlet means.

13. The apparatus of claim 12 wherein heating means is provided for the heat compensation chamber.

14. The apparatus of claim 12 wherein control means are connected with said gas inlet means and said gas outlet means for regulating the flow of gas through said inlets and outlets.

15. The apparatus of claim 12 wherein the individual chambers are separated from one another by partition walls extending from the top and bottom walls.

16. The apparatus of claim 15 wherein the individual chambers are subdivided by partition walls extending from the top and bottom walls of the chamber.

17. The apparatus of claim 12 wherein the first traveling grate is formed of grate rods which are spaced further apart at the middle area of the traveling grate than at the marginal areas thereof, said middle and marginal areas extending transversely to the traveling grate, a stripper having a bottom edge is supported above and transversely of the traveling grate which stripper has a middle portion having its bottom edge lying in closer spaced relationship with said grate than do the bottom edges of the marginal portions of said stripper to permit the layer of pellets to be higher in its marginal zones, and said suction means connected with said gas outlet means is a conduit having an opening therein disposed transversely of and below the first traveling grate which conduit decreases in cross-section as it extends from the middle thereof and outwardly toward said marginal zones of said grate.

References Cited in the file of this patent

UNITED STATES PATENTS

| | | |
|---|---|---|
| 1,426,287 | Gelpke | Aug. 15, 1922 |
| 1,896,625 | Hyde | Feb. 7, 1933 |
| 2,174,066 | Ahlmann | Sept. 26, 1939 |
| 2,283,758 | Pike | May 19, 1942 |
| 2,687,879 | Heiligenstaedt | Aug. 31, 1954 |